Feb. 14, 1939.     J. G. BAKER ET AL     2,147,420
HIGH SPEED ELECTRIC MOTOR ASSEMBLY
Filed July 12, 1935     4 Sheets-Sheet 1

WITNESSES:
E. A. M'Closkey.
Wm. C. Groome.

INVENTORS
John G. Baker, Frank C. Rushing,
Stanley J. Mikina and Harry D. Else.
BY O. B. Buchanan
ATTORNEY Feb. 14, 1939.    J. G. BAKER ET AL    2,147,420
HIGH SPEED ELECTRIC MOTOR ASSEMBLY
Filed July 12, 1935    4 Sheets-Sheet 2
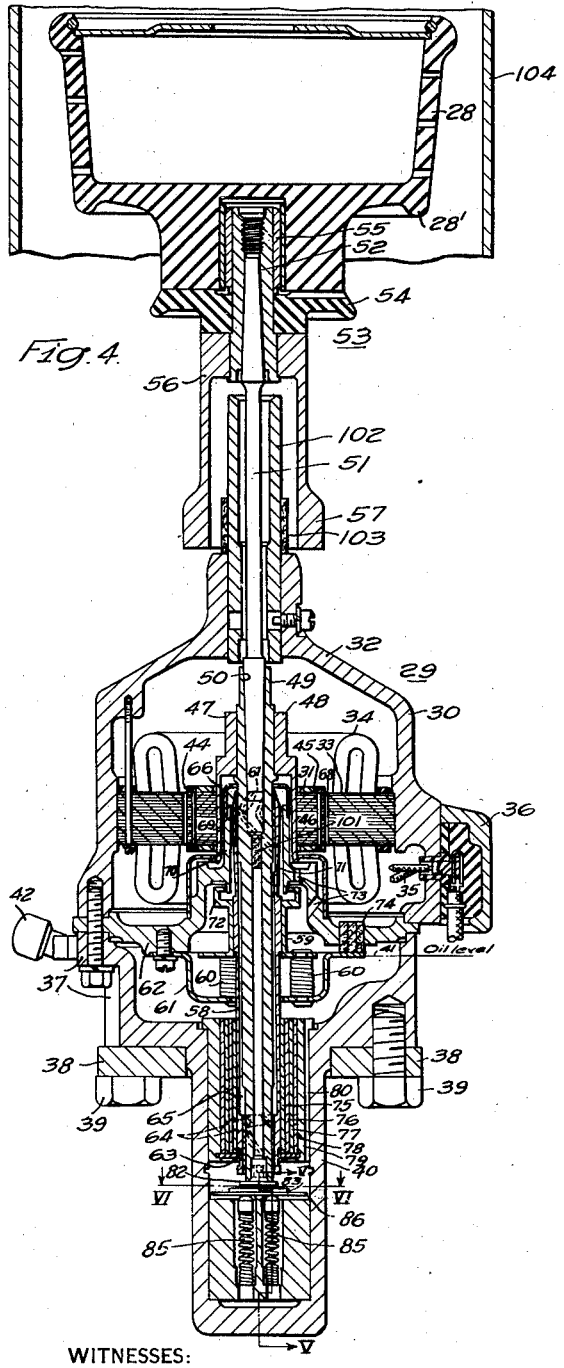
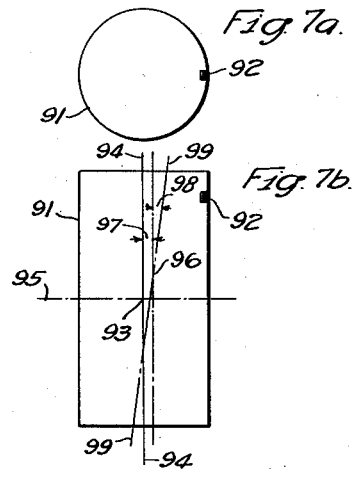
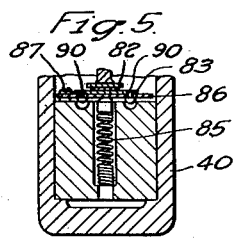
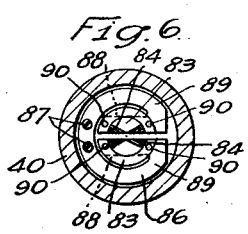
WITNESSES:
E.A. McCloskey
Wm. C. Groome
INVENTORS
John G. Baker, Frank C. Rushing,
Stanley J. Mikino and Harry D. Else.
BY O.B. Buchanan
ATTORNEY

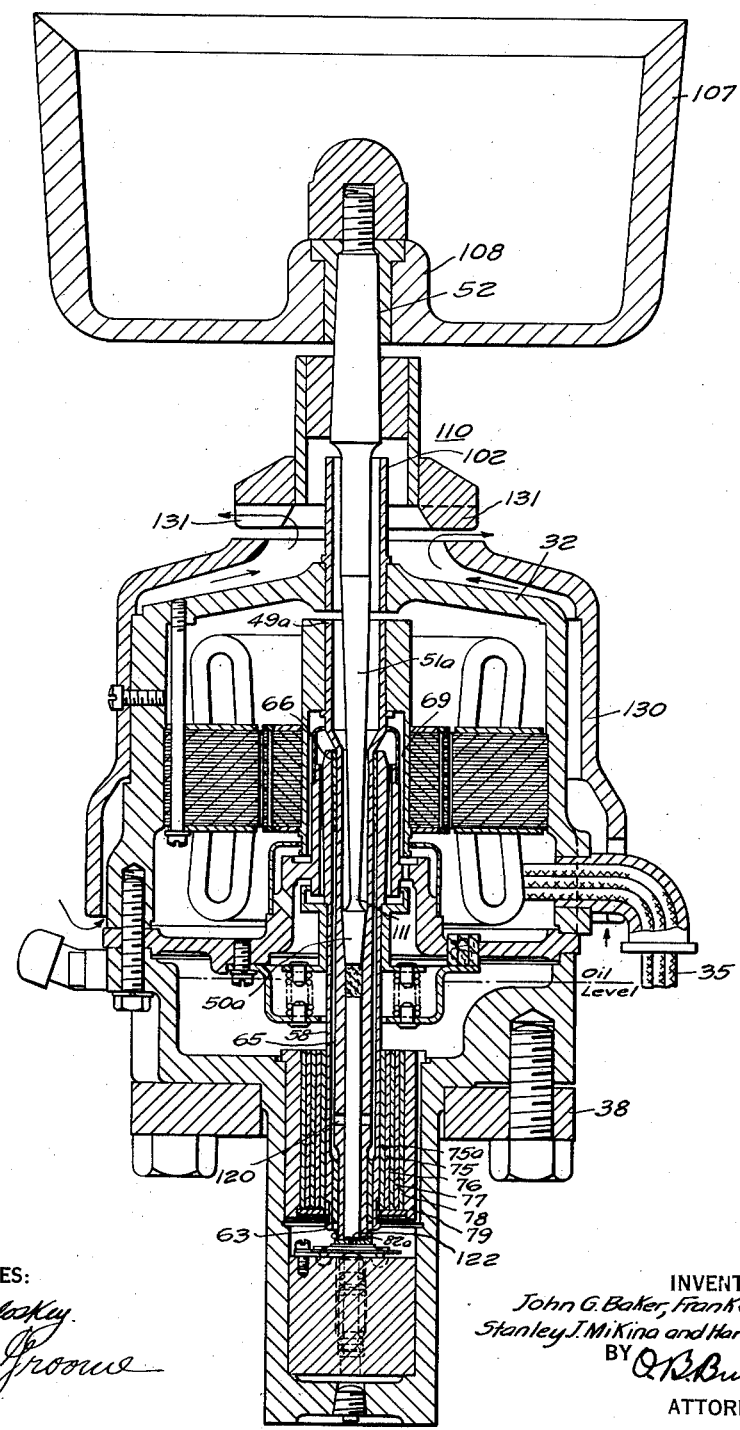

Feb. 14, 1939.   J. G. BAKER ET AL   2,147,420
HIGH SPEED ELECTRIC MOTOR ASSEMBLY
Filed July 12, 1935   4 Sheets-Sheet 4
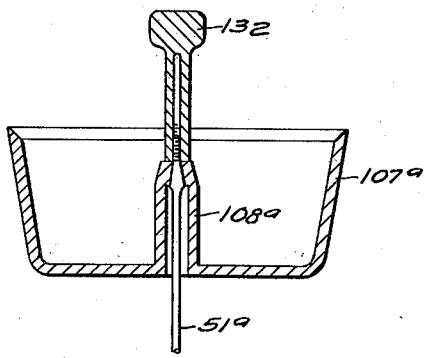
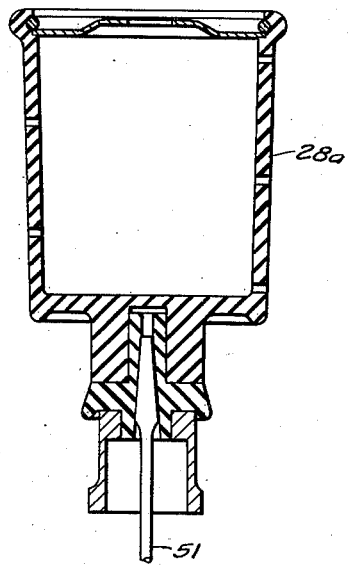
WITNESSES:
INVENTORS
John G. Baker, Frank C. Rushing,
Stanley J. Mikina and Harry D. Else.
BY
ATTORNEY Patented Feb. 14, 1939

2,147,420

UNITED STATES PATENT OFFICE 2,147,420

HIGH SPEED ELECTRIC-MOTOR ASSEMBLY

John G. Baker and Frank C. Rushing, Pittsburgh, and Stanley J. Mikina, Wilkinsburg, Pa., and Harry D. Else, Springfield, Mass., assignors to Westinghouse Electric & Manufacturing Company, East Pittsburgh, Pa., a corporation of Pennsylvania Application July 12, 1935, Serial No. 31,074

30 Claims. (Cl. 308—146)

Our invention relates to high-speed assemblies, and it has particular relation to a cantilever-shaft, vertical-type, high-speed electric motor such as is utilized for spinning the buckets in rayon manufacture, or such as is utilized in centrifuges such as extractors for drying the "cake" of rayon thread in the rayon-spinning industry.

An object of our invention is to provide a radically new spinning-motor design, the superiority of which, to any previous design, has been amply demonstrated by thorough life- and laboratory-tests, and by actual service.

An object of our invention is to provide a spinning-motor assembly in which the motor-stator can be bolted directly and firmly to the supporting rail or foundation, which feature is made possible by the fact that the compliance and damping is between the stationary and rotating parts of the motor, as distinguished from the prior designs in which the motor-frames were commonly supported on rubber or cork pads. By "compliance" is meant the relative motion of the parts which is permitted by the mounting of the parts, or the relative motion which is made use of in providing damping.

An important object of our invention is to provide a novel motor-assembly of the type indicated, which will permit the use of higher speeds, ranging from 6,000 to 15,000 revolutions per minute or even higher, according to the preference of the rayon-manufacturer or other user of the motor. We have successfully operated our motor-assemblies at speeds considerably higher than 15,000 R. P. M., with a large unbalance in the bucket or driven member.

An important object of our invention is to provide a new motor-assembly which is capable of spinning a heavily unbalanced load at a high speed, without vibration of the motor-frame. Motor-vibration, in previous designs, has resulted in frequent insulation-failures and broken windings and connections, which, we believe, are completely eliminated in our new design.

An important object of our invention is to provide a new motor-assembly which is capable of spinning a heavily unbalanced load at a high speed, without imposing heavy loads on the bearings, as a result of the unbalanced operation.

By the elimination of motor-vibration and heavy bearing-loads as a result of unbalanced operation, we have been able to substantially eliminate the enormous maintenance costs which have been experienced with previous designs, and which have amounted to something like 3¢ per motor per day, on the designs commonly in use immediately preceding our present invention.

To accomplish the foregoing and other objects, it is necessary to have a damping means and medium, which constitutes a necessary part of our motor-aggregate.

A very important object of our invention is to achieve the foregoing ends in a structure in which the rotational inertia is a minimum, thereby permitting high rates of acceleration and deceleration, in starting and stopping the spinning operation, thus saving time, and also materially contributing to the curtailment of the motion obtained at the critical speed or speeds of natural vibrations which must be passed through, in order to attain the operating speed of the mechanism, although our design does not really require rapid acceleration, as far as vibration is concerned.

An object of our invention is to provide a novel design of either a fixedly-mounted or cushion-mounted spinning motor, in which all bearings are below the motor-rotor, making it possible to secure the resulting advantages of (1) sleeve bearings throughout, (2) a single oil-chamber, (3) a common oil-supply for bearings and dampers, and (4) the elimination of all oil-seals. In previous designs, where one of the bearings was above the motor-rotor, a ball-bearing was required for this purpose, because a durable sleeve bearing requires a substantially flooded lubrication, which would involve considerable difficulty in the oil-seals or other means for keeping the oil out of the motor-winding, in a high-speed spinning-motor design in which a sleeve bearing was above the rotor of the motor. Sleeve bearings, are, in general, advantageous in their low cost and in the small amount of space, radially, which they require, as compared with roller- or ball-bearings.

A further object of our invention relates to the use of a shoe-type of thrust bearing, and the use of a yieldable support for the thrust bearing, which substantially removes one of the critical speeds of the dynamic system, or brings the vertical critical speed down to such a low value as to be harmless, in a motor-assembly made in accordance with our invention.

With the foregoing and other objects in view, our invention consists in the systems, methods, combinations and apparatus hereinafter described and claimed, and illustrated in the accompanying drawings, wherein:

Figures 1a, 2a, and 3a are diagrammatic perspective views of various flexible-shaft dynamic systems of rotating elements which will be referred to in the explanation of the phenomena of critical speeds and displacements due to unbalancing;

Figs. 1b, 2b, and 3b are figures corresponding, respectively, to Figs. 1a, 2a, and 3a, showing the variation of the amplitude of motion with the frequency or speed or rotation, and showing the various instantaneous positions taken by the shaft under different conditions of operation;

Fig. 4 is a somewhat diagrammatic longitudinal sectional view of a rayon spinning-motor assembly, showing the relationships of the parts, without any attempt at being drawn to exact scale;

Fig. 5 is a transverse vertical sectional view of the thrust bearing, approximately on the line V—V of Fig. 4;

Fig. 6 is a horizontal sectional view of the thrust bearing, on the line VI—VI of Fig. 4;

Figs. 7a and 7b are, respectively, plan and elevational diagrammatic views which will be referred to in the explanation of the behaviour of the apparatus shown in Fig. 4, under the influence of an unbalanced weight added to the bucket;

Fig. 8 is a view similar to Fig. 4, showing a modification of our invention as applied to a centrifuge or extractor, such as is used in the rayon industry;

Fig. 9 is a fragmentary view, similar to the top portion of Fig. 4, showing a further modification as applied to a centrifuge or extractor; and Fig. 10 is a similar fragmentary view illustrating a modified form of a rayon bucket.

Figure 1A:
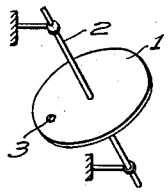

In Fig. 1a is shown an unbalanced disc 1 mounted at the center of a flexible vertical shaft 2, the unbalancing being produced by means of a small weight 3 added to the disc. The amplitude of vibration of the disc is a function of the rotational speed, and is shown approximately in the curve 4 of Fig. 1b. There is only one critical speed 5, even though the disc has dynamic unbalance, that is, even though the weight 3 should be either above or below the center of gravity of the disc. At the critical speed 5, the shaft 2 will deflect very greatly, as indicated by the small diagram 6 placed above this critical-speed point of the curve 4. At higher speeds, well beyond the critical speed 5, the deflection of the shaft 2 will be much smaller, as indicated by the small diagram 7.

The critical speed 5 is a resonance-speed of lateral or translational displacement of the shaft, and occurs at a speed, or resonance-frequency, which varies in accordance with $$\sqrt{\frac{k}{m}}$$

where $k$ is the spring-constant of the shaft, or force necessary to cause unit deflection in the shaft, and $m$ is the total mass of the rotating body 1.

Figure 1B:
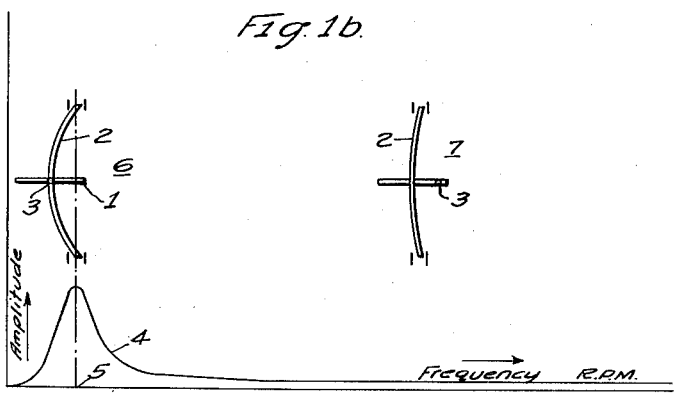
Figure 2A:
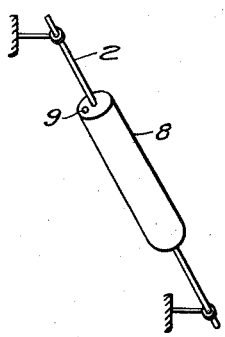

In Fig. 2a, the rotor member, instead of being substantially a disc, having relatively no axial extent along the shaft, is illustrated as being a cylinder 8 having an axial length which is long, compared to its diameter. This cylinder carries a small unbalancing weight 9, which, in general, as shown, will be displaced radially with respect to the shaft 2 and axially with respect to the center of gravity of the rotor 8. Such a dynamic system will have two critical speeds 10 and 11, respectively, as shown by the curve 12 in Fig. 2b. The first critical speed 10, which we call the lateral critical speed, corresponds exactly to the critical speed 5 of the Fig. 1 combination, and consists of a lateral displacement of the shaft, at the rotating mass 8, as indicated at 13 in the small diagram 14 placed above the critical speed 10 in Fig. 2b.

Figure 2B:
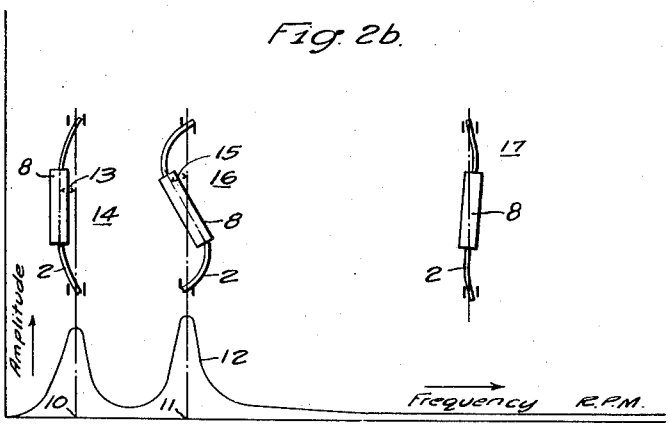

The second critical speed 11 in Fig. 2b is what we call the angular critical speed, and it corresponds to a displacement of the shaft through a certain angle 15, as indicated in the small diagram 16 placed over the critical speed 11 in Fig. 2b. The frequency, or revolutions per minute, at which this angular critical speed or resonance-condition occurs, varies with the quantity $$\sqrt{\frac{k'}{I_H - I_V}}$$

where $k'$ is the angular spring-constant of the shaft, or the moment required for unit angular deflection of the shaft; $I_H$ is the horizontal moment of inertia of the mass 8, by which we mean, the inertia about a horizontal diameter or axis passing through the center of gravity, that is, about an axis perpendicular to the axis of the shaft; and $I_V$ is the vertical moment of inertia of the mass 8, or the inertia about the shaft-axis, which is assumed to be vertical.

In Fig. 2b, this angular critical speed 11 must be passed through, before complete dynamic adjustment of the system can take place. At a speed which is considerably higher than both of the critical speeds 10 and 11, all of the unbalance in the dynamical system shown in Fig. 2 is taken up or adjusted dynamically, that is, by the movement or rotation of the mass, the shifting of the axis of rotation of the mass being practically sufficient (neglecting friction or damping in the shaft) so that the mass of the rotor, rotating about the new axis of the rotor, will have a centrifugal force and a moment about the center of gravity of the rotor which are nearly exactly equal and opposite to the centrifugal force and the centrifugal moment of the unbalanced weight 9 in Fig. 2a.

At a speed which is considerably higher than both of the critical speeds 10 and 11, the dynamic system shown in Fig. 2 continues to rotate about an axis which is angularly displaced with respect to the original position of the shaft, but the angular displacement is very much smaller than at the critical speed 11, as shown by the diagram 17 in Fig. 2b.

It will be noted that the angular critical frequency or speed 11 does not occur except when the horizontal moment of inertia $I_H$ of the rotating mass is larger than the vertical moment of inertia $I_V$ thereof. In Fig. 1a, the rotating mass was a disc 1 which had a horizontal moment of inertia which is smaller than the vertical moment of inertia, so that the angular critical speed, corresponding to 11 in Fig. 2b, was negative, or non-existent, this mode of motion being prevented by the gyroscopic effect of the disc. A little consideration of the quantity $$\sqrt{\frac{k'}{I_H - I_V}}$$

will show that the angular critical speed may be reduced by either one or both of two expedients, namely, by making the shaft more flexible, thereby reducing $k'$, or by increasing the difference between $I_H$ and $I_V$, that is, increasing the horizontal inertia and/or decreasing the vertical inertia. We shall refer to this circumstance later on, in our explanation of our invention.

In more complicated dynamic systems, that is, systems of movable masses and springs, having more freedoms of movement, or kinds of movement of the masses, than in Fig. 2a of the drawings, an additional critical speed is added, in general, for each additional freedom of movement. Thus, in spinning-motor assemblies of the prior art, it was common to mount the motor on rubber blocks, which permitted the mass of the motor as a whole to move up and down in a translatory motion, to move sidewise in a translatory motion, and to tilt angularly, thus adding three degrees of motion not present in the dynamic system shown diagrammatically in Fig. 2a.

Figure 3A:
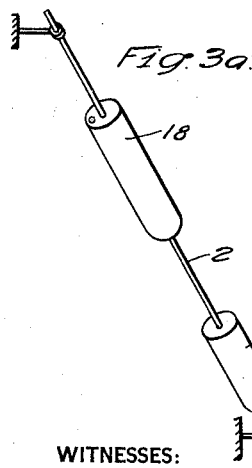

In Fig. 3a, we have shown the effect of adding only one more degree of motion to the system shown in Fig. 2a. Since any condition of unbalance can be resolved into a lateral displacement of the center of gravity of the rotating mass, we have illustrated the equivalent effect of adding one other freedom of movement to the dynamic system of Fig. 2a, by showing two cylindrical rotors 18 and 19 mounted at different points on the flexible vertical shaft 2 in Fig. 3a.

Figure 3B:
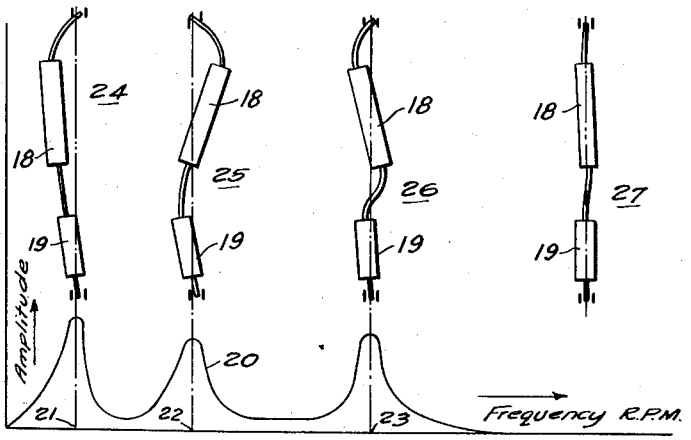

In Fig. 3b, the curve 20 shows the relation between the amplitude of displacement of the shaft, and the frequency or revolutions per minute, showing the three critical speeds 21, 22 and 23, with the corresponding instantaneous positions of the rotors as shown in the small superposed diagrams 24, 25 and 26, respectively. At operating speeds much higher than the last critical speed 23, the instantaneous positions of the rotors will be as indicated in the small diagram 27 in Fig. 3b.

According to a preferred form of our invention, we provide a spinning-motor aggregate having not more than two principal critical speeds as shown in Fig. 2b, as distinguished from the multiplicity of principal critical speeds present in spinning-motor aggregates commonly used prior to our invention; and we accomplish this effect by a novel design and positioning of the parts, as will be subsequently explained. It is necessary, of course, that the operating speed shall be some speed which is not exactly equal, or even approximately equal, to either one of the principal critical speeds.

We prefer that the lower one of the two principal critical speeds, (and this lower one may be either the angular critical speed or the lateral critical speed, depending upon the constants, although preferably it is the lateral critical speed), should be well below the operating speed of the aggregate. The higher one of the two critical speeds may be either made sufficiently high to occur at a speed which is very much higher than the maximum operating speed of the aggregate, as in the motor-aggregate shown in Fig. 8 of our drawings, or it may be made to have a relatively low value, preferably commensurate with the lower critical speed, and necessarily materially lower than the operating speed of the aggregate, as is the case in the motor-aggregate illustrated in Fig. 4 of the drawings.

In either event, there will be at least one critical speed through which the aggregate must pass, in being accelerated from standstill to its operating speed; and, in order to safely pass through that critical speed, or speeds, as the case may be, it is necessary to provide adequate damping, that is, to permit movement of some part of the system and to absorb the energy of that movement by causing it to exert work which will be expended in friction or otherwise. The damping element may be placed anywhere where there is vibratory motion, except in the rotating element, in which place the damping means would introduce a tendency to oscillation when operating at high speeds. Various damping methods which have been used in the past include: (1) the stirring of a liquid; (2) the distortion of material with internal damping, such as rubber or cork; and (3) a rubbing of solid parts on one another. Of these three available damping methods, we have chosen the stirring of liquids as being the most important, since we have oil, necessarily, for lubrication, and since oil does not deteriorate or wear, as is the case with rubber or cork, or rubbing solids.

In order to stir a sufficient amount of oil, in order to obtain the requisite damping, we have adopted the expedient of a series of concentric, loosely spaced, nested members or cylinders, such as have been used in various places before. In such a damping system, the translational lateral displacement of the concentric cylinders or rings produces friction in the oil, thus introducing damping, which damping attains a maximum value at a certain speed, where the damping is most effective, dependent upon the viscosity of the oil and the clearance between the concentric rings. At speeds higher than the most effective damping speed, the concentric-ring oil-damper becomes relatively stiff, opposing the vibrational lateral displacement of the rings more and more, as the speed increases, until at a sufficiently high speed, the oil-damper becomes practically a rigid mounting, holding the concentric rings all in concentric positions with respect to each other, none of them displaced out of the common axis. It has been necessary, therefore, to design the oil-damper with respect to the critical speeds at which the damping is required, and to design said critical speeds so that they will fall within the effective range of the oil-damper.

In accordance with our invention, after determining that we would use an oil-damper, we next determined that the oil-damper would be placed where the oil was, namely, in the bottom of the oil-reservoir, and we consequently designed our motor-aggregate so that there would be freedom of lateral movement at this point where the damper was to be, so that the lateral movement could be effectively damped by the damper. This resulted in a design in which a shaft is restrained against lateral movement at some point above the bottom of the oil-reservoir, so that the shaft would extend down into the bottom of the oil-reservoir and have damped lateral movement at that point. Since, according to our design, the stator of the electric motor would have to be fixedly anchored to the supporting beam or foundation, it became highly desirable, in order to make possible a small air-gap between the motor-rotor and the motor-stator, to cause the fixed point of the shaft, where lateral translatory movement was restricted, to be approximately at the center-line of the motor-stator, or at least very close to the motor-rotor.

The basic principles of our design will be better understood by reference to Figs. 4, 8, 9 and 10, showing four different embodiments of our invention.

Fig. 4 shows an electric-motor aggregate, designed to spin a driven-mass assembly, such as a conventional rayon bucket 28, usually made of Bakelite composition or some other light-weight, corrosion-resisting material, at high speeds, such as those previously mentioned. The bucket may advantageously be provided with a drip-edge 28' around its lower end, near the outside. The aggregate includes a two-pole, polyphase, squirrel-cage motor 29 adapted to be supplied with electric energy at a frequency sufficiently high to produce the desired rotational speed of 6,000 to 15,000 R. P. M., or higher, according to the desire of the user of the motor. It will be understood, of course, that the motor is provided with suitable control-means (not shown) for starting and stopping the same at will, said starting and stopping periods being preferably made as short as possible, (preferably line-start and -stop), in order to curtail vibration in passing through critical speeds, as will subsequently be explained.

The electric motor 29 has a stator member 30 and a rotor member 31. The stator member comprises a frame 32 carrying the stator-core or punchings 33 which, in turn, carry the stator windings 34 having leads 35 which are brought out to an outlet member 36.

The stator member 30 also has a bottom end-bracket 37 which also constitutes the mounting-means for mounting the motor on a pierced or slotted horizontal supporting-rail 38, to which the motor is firmly bolted as indicated at 39. The bottom end-bracket 37 has a depending central oil-sump portion 40 which constitutes the bottom portion of an oil-reservoir. The top level of oil in the oil-reservoir is indicated at 41, and oil is introduced by means of an oiler 42.

The motor-rotor 31 consists of a rotor-core or punchings 44 carrying squirrel-cage rotor-windings 45. The rotor-core 44 is mounted upon an enlarged tubular portion 46 of a quill 47, the top portion 48 of which is of reduced diameter and is securely attached to a hollow vertical shaft 49, which extends down to a point well within the oil-sump 40. The hollow rotor-shaft 49 has a tapered recess 50 at its top, to receive, and frictionally hold, the bottom end of a slender upstanding spindle 51, the top end of which has a tapered fit 52 with a so-called adapter 53 which, in turn, supports the rayon bucket 28.

The adapter 53 consists of a light-weight horizontal disc-portion 54 which frictionally supports the bucket 28, and an upstanding center post or nose 55 which centers the bucket on the adapter. The aforesaid horizontal disc 54 and the aforesaid upstanding post 55 are standard or conventional parts of adapters such as have been used heretofore in rayon spinning-motor aggregates.

In our Fig. 4 design, however, we materially modify the adapter 53 by adding a relatively heavy depending portion 56 terminating, at its lower end, in an annular mass 57 which surrounds, and is closely spaced from, the slender spindle-extension 51 of the shaft, at a point below the point of attachment 52 of the adapter to the shaft. Our object, in attaching this annular mass 57 to the adapter 53, as a rigid extension of the rotating bucket-assembly, in spaced axial relation to the bucket-proper 28, and in disposing said annular mass with only a small radial spacing from the shaft, is to increase the horizontal moment of inertia $I_H$ of the bucket-assembly or driven mass, consisting of the adapter 53 and the bucket 28, as an integral unit, without materially increasing either the total mass $m$ or the vertical inertia $I_V$ of said mass. Thus, we increase the denominator, in the expression $$\sqrt{\frac{k'}{I_H - I_V}}$$

for the angular critical speed, without materially affecting the lateral critical speed $$\sqrt{k/m}$$

Our Fig. 4 design is a design in which the angular critical speed is for the first time, so far as we are aware, brought down to a value which is smaller than the operating speed of the aggregate, so that we obtain substantially complete dynamic adjustment for unbalanced weights in the spinning bucket, at the operating speed of the device.

Heretofore, rayon bucket assemblies have been utilized, in which, according to our tests, the horizontal inertia $I_H$ has been larger than the vertical inertia $I_V$, but only slightly larger than the same, so that there was an angular critical speed, $$\sqrt{\frac{k'}{I_H - I_V}}$$

which was very much higher than the operating speed, thus subjecting both the motor and the bucket-assembly to severe vibration due to the dynamic unbalance which is always obtained in the bucket-assembly.

The lateral critical speed $$\sqrt{k/m}$$

in prior rayon bucket assemblies, has usually been well below the operating speed, so that it was not necessary to resort to longer, or more slender, spindles (so as to obtain a smaller spring-constant $k$) in order to reduce the lateral critical speed, which was already sufficiently small.

In designs in which the horizontal inertia $I_H$ is only slightly larger than the vertical inertia $I_V$, it is not practicable to reduce the angular spring-constant $k'$ to a value small enough to bring the angular critical speed $$\sqrt{\frac{k'}{I_H - I_V}}$$

below the operating speed, as a spindle sufficiently flexible to accomplish this result would be too fragile for commercial use.

In this state of the art, our present invention embraces (1) our analysis of the dynamic system to discover the defects in, and the possible cures of, the practices in the prior art; (2) our reduction in the numbers (or "degrees of freedom") of movements, and specifically our employment of internal damping; and (3) our Fig. 4 design in which all of the principal critical speeds are brought lower than, and preferably considerably lower than, the operating speed, so as to eliminate the effect of bucket-unbalance on either the motor or the bucket-assembly.

It is possible for us to eliminate the dynamic unbalance of the bucket-assembly in either one of two ways, that is, either (1) by making the horizontal inertia $I_H$ less than the vertical inertia $I_V$, so that the expression $$\sqrt{\frac{k'}{I_H - I_V}}$$

will have no real solution, and the angular critical speed will therefore be non-existent, which is a possible, and in some respects desirable, design when coupled with the elimination of the vibrational mounting of the motor-frame and the utilization of efficient rotor-damping; or (2) by making the angular critical speed, as determined by the expression $$\sqrt{\frac{k'}{I_H - I_V}}$$

lower than, and preferably considerably lower than, the operating speed, as we have done in our Fig. 4 design.

If we had utilized a rotating mass, or bucket-assembly, having a horizontal moment of inertia $I_H$ equal to, or less than, its vertical moment of inertia $I_V$, we would have obtained conditions similar to the rotating-disc dynamic system shown in Fig. 1a, in which complete dynamic adjustment was obtained by rotation about a laterally displaced axis. This requires either a decrease in the horizontal inertia $I_H$, or an increase in the vertical inertia $I_V$, or both. A decrease in the horizontal inertia $I_H$ would mean a decrease in the vertical dimension or height of the rayon bucket which is now in common use in the spinning industry, and this would be highly undesirable, as it would necessitate a smaller package of yarn, and it would increase the production-costs. An increase in the vertical inertia $I_V$ would mean the addition of mass to the rim of the bucket-assembly, that is, adding mass in a radial direction (rather than adding mass 57 in an axial direction as we have done in our Fig. 4 design).

Any increase in the vertical inertia $I_V$, which is the rotational inertia of the bucket-aggregate, is usually undesirable because it increases the accelerating and stopping times of the unit. The rate of acceleration (and deceleration) is determined, of course, by the available torque (which is supplied by the motor) and the moment of inertia of the whole rotating-part about its vertical axis; the decelerating (or stopping) torque being usually produced by reversing two leads of the three-phase motor-winding, or by applying direct-current excitation to one or more phases.

Increasing the time of starting and stopping is uneconomical, from a commercial point of view, on account of the loss of machine-time and the increase in operator-time in "doffing", when the machine must be stopped and the bucket removed, in order to take out the "cake" of silk thread therefrom. A further disadvantage of any increase in the time of starting and stopping is its very deleterious effect upon the maximum amplitude of vibration, or shaft-displacement at the mass $m$, which is attained in passing through any one of the principal critical speeds of the dynamic system. The maximum amplitude of vibration attained while accelerating or decelerating through a critical speed is determined by a complicated relation. Qualitatively, however, it is important that the rate of acceleration (or deceleration) shall be as high as possible, in order to pass through the critical speed before the vibration has had time to build up to a high amplitude.

For the foregoing reasons, in undertaking to produce a design in which complete dynamic adjustment or balance is obtained at the operating speed of the aggregate, we prefer not to make a large increase in the vertical inertia $I_V$; and we have shown, in our Fig. 4 design, the accomplishment of the desired result by the second-mentioned principle, which we believe to be new in this type of aggregate, namely, increasing the horizontal moment of inertia $I_H$ to a value which, when taken in conjunction with the other constants of the system, will produce the necessary reduction in the angular critical speed, $$\sqrt{\frac{k'}{I_H - I_V}}$$

to a value which is lower than, and preferably considerably lower than, the operating speed. We accomplish this by employing a spindle having a low spring-constant $k'$, and by attaching an annular ring or mass 57 to a depending portion 56 of our adapter 53. By spacing this ring axially from the bucket, and by making the ring as small in diameter as possible, while still clearing the shaft, we obtain a large increase in the horizontal inertia $I_H$, with but a small increase in the rotational inertia $I_V$, thus obtaining a horizontal inertia $I_H$ which is considerably greater than the vertical inertia $I_V$, and making the most effective use of our added material 56-57.

Our depending annular mass 57 on the adapter 53 preferably also serves the further important function of causing the horizontal inertia of the adapter and spindle-head, alone, that is, without the bucket 28, to be materially greater than the vertical inertia thereof, so that the above-described advantages of operating above all of the principal critical speeds may be retained if our spinning-motor aggregate is brought up to full speed while the bucket is off, during "doffing."

Since the forces transmitted to the motor and bearings from the rotating bucket-assembly are transmitted solely through the spindle extension 51 of the shaft, we prefer a spindle with a low spring-constant $k'$ (that is, a long, slender spindle), to protect the motor.

It will be apparent, upon consideration of our bucket-adapter construction, that the same increase in the horizontal inertia $I_H$ could be obtained by increasing the axial dimensions of the bucket itself, and reducing or omitting the added weight 57, as shown at 28a in Fig. 10. If it should be necessary, at the same time, to maintain the same rotational inertia $I_V$ as on conventional equipment, the diameter of the bucket could be slightly reduced, as indicated. The advantages of such an elongated bucket, as compared with those now in use, are several, including a greater quantity of silk in the cake, and hence a longer period between doffs, which is of great importance to rayon manufacturers, besides other advantages, including lower power-consumption, lower rotational inertia, and lower stresses in the bucket, for a given capacity. The adoption of an elongated bucket, however, would involve major changes in existing equipment, and great expense. The stroke of the traverse mechanism (not shown), which raises and lowers the funnels (not shown) for guiding the yarn into the buckets, cannot easily be changed on existing rayon spinning machines. Furthermore, new bucket-molds would be required, to produce longer buckets. We have, therefore, in our preferred embodiment, as shown in Fig. 4, described and illustrated our invention as applied to existing buckets and spinning frames; although we desire it to be distinctly understood that the invention, in its broader aspects, is not so limited.

The principle which we have applied, of bringing the angular critical speed below the operating speed, and the constructions which we have employed to accomplish this, we believe to be new, in this type of aggregate, as shown in Fig. 4. However, while we have embodied this principle in our preferred aggregate, we do not wish to be limited to its use with our motor-assembly: neither do we wish to be limited to the use of our preferred motor-assembly with this driven load assembly.

In the embodiment of our invention shown in Fig. 4, the hollow motor-shaft 49 is journaled in a single guide-bearing means, consisting of a single elongated bearing-housing in the form of a tube 58 which is supported by means of a centrally disposed collar 59, which is pressed onto the bearing-tube 58 and which is supported by three coil-springs 60, the other ends of which are secured to a stationary cup 61 bolted to a spacing-plate 62, which is secured to the stator-frame 32 at the point of attachment of the lower end-bracket 37. The three coil-springs 60 not only support the weight of the guide-bearing means, but also restrain the same against rotation.

The bearing-housing or tube 58 is provided, at its bottom end, with a journal bearing 63 for the rotor-shaft 49, and this bearing (or the journal) is grooved in a well-known manner, as indicated at 64, so as to lift oil from the bottom end of the bearing and deliver it at the top end of the bearing 63, causing an upward flow of oil within the space 65 between the bearing-tube 58 and the rotor-shaft 49. Oil is thus lifted and delivered to the top end of the bearing-tube 58, where there is disposed a second journal bearing 66 for the rotor-shaft 49, this top bearing being also grooved in any suitable manner, as indicated at 67. In our preferred arrangement we use two grooves located 120° or some angle other than 180° apart in each bearing.

In the embodiment of our invention shown in Fig. 4, we provide, as an essential part of our aggregate, some means for permitting substantial angular movement, but restricting lateral movement, of the shaft-axis, the elements rigid therewith, and the bearing-tube 58 and bearings, at a point in or near the horizontal center-line of the cores 33 and 44. Furthermore, in our construction, we preferably design the electrical elements of the motor so as to be as short in an axial direction as is consistent with good manufacturing practice. This necessitates rotor- and stator-diameters which are larger than conventional, for a given rating. The utilization of a motor-rotor which is short in an axial direction, and the utilization of means for restricting the lateral motion of the rotor-assembly and bearing-tube at the horizontal axis of the electrical elements, result in the edges of the rotor-core 44 having a minimum lateral component of the angular motion of the motor-shaft and rotor assembly as it tilts in making its angular adjustments. We have determined that the desired angular freedom of the motor-rotor and bearing assembly can be obtained, in our design, with only a moderate increase in the motor air-gap as compared with normal motor-designs. We choose an air-gap (indicated at 68 in Fig. 4) of approximately 20 mils, as compared to 12 or 15 mils on conventional squirrel-cage motors of equivalent rating. Excessive air-gap is undesirable, as it results in poor electrical performance, particularly in low power-factor.

Many means for producing the effect of laterally restricting the motion of the shaft, at approximately the center-line of the motor-rotor core, or at any other desired point as close to the rotor-core as convenient, may be utilized in accordance with our invention.

In Fig. 4, however, we have shown a novel, and very useful, means for producing this lateral-restraint action upon the shaft at the center-line of the motor-rotor. To this end, we have designed what we call an oil-hinge, which we believe to be quite new and important, in this art. Our oil-hinge consists of a means for providing a small annular space 69 between the outside of the bearing-tube 58, at the top end thereof, and the inner bore of an upstanding annular member 70, which is carried by the previously mentioned spacing-plate 62 which is carried by the stator-frame 32. The annular space 69 of the oil-hinge is flooded with oil, which flows out of the top of the top journal bearing 66, by means of the oil-circulation previously explained, so that this oil flows down through the annular space 69 and provides a "hinge" action, permitting the rotor to "hinge" or tilt angularly slightly, but restraining it from any substantial horizontal displacement or lateral translational movement, by reason of the small clearance between the inner bore of the sleeve 70 and the outer surface of the bearing-tube 58. In order that this "hinge" action may take place as near the center of the rotor-core as possible, the outer surface of the bearing-tube 58 is slightly enlarged, for about one-half an inch, at the center of the rotor-core 44, so as to have its snuggest fit in the sleeve 70 at this point, the outer diameter of the bearing-tube 58 being tapered off below this point, as indicated (and considerably exaggerated for illustration-purposes) at 71 in Fig. 4.

The oil, on passing down through the oil-hinge 69, collects in an annular oil-drip pan or cup 72, which surrounds the lower edge of the oil-hinge 69, so that a constant supply of oil to the hinge will be assured, even when the motor is first starting up after a long period of disuse. The oil overflows from the drip-pan 72 and returns to the oil-level 41 in the oil reservoir.

Any oil which creeps up above the upper end of the top journal-bearing 66 and leaves the inner surface of the quill cylinder 46 is returned to the normal oil-circulating system through various openings or holes 73, and any oil which reaches the top side of the spacing-plate 62, in the space occupied by the stator winding 34, is returned to the reservoir by means of a felt filter or strainer 74.

An essential feature of our invention is that the design is so made that the part of the shaft which moves laterally, and to which the damping is applied, is the bottom part of the shaft. Our invention contemplates the use of any suitable damping means, preferably disposed at the bottom part of the shaft. We very much prefer to employ an oil-damper, however, for the reasons which have been previously set forth, and we prefer to apply this oil-damper to the bottom end of a single rigid guide-bearing means, so that the whole guide bearing will be hinged at its top end and damped at its bottom end.

The oil-damper consists of a plurality of concentric nested members in the form of cylindrical rings or sleeves 75, 76, 77, 78 and 79, with a suitable close spacing between the successive rings; and between the inner ring 75 and the outer surface of the bearing-tube 58, and between the outer ring 79 and the inner bore of the depending oil-sump portion 40 of the oil-reservoir, the latter constituting, in effect, another one of the concentric sleeves. The area and the clearance of the successive sleeves of the damping unit, and the number of sleeves in the unit, all determine the amount of damping and the particular speed at which the damping is the most effective. These sleeves are immersed in the oil of the oil-reservoir, and hence the clearances between them are filled with oil. In the particular design shown in Fig. 4, the damping tubes have approximately 10 mils clearance on radius, between each other. In order to assure an adequate circulation of oil underneath the nest of damping sleeves, the outer sleeve 79 is shown as being provided with one or more vertical grooves 80, down which oil can circulate, in passing to the lower end of the lower guide or sleeve bearing 63.

Several schemes have been used, in the past, for taking the thrust of the rotating shaft of a high-speed spinning-motor. One of these ways has been to utilize two spaced, annular-type, deep grooved, ball-bearings for guiding the shaft. One of these ball-bearings takes the thrust-load by having its outer race located between inwardly extending shoulders in the housing-bore, to limit endwise movement. The outer race of the other ball-bearing must of necessity be free to slide in the housing-bore in order to accommodate differences in expansion of the shaft and housing of the motor, resulting from changes in temperature of the motor-parts during operation. Great difficulty has been experienced in manufacturing such motors, and practically insurmountable difficulty in servicing the same, in order to obtain a fit of the outer race of the "floating" bearing that will be loose enough to permit accommodating movement for temperature-changes and yet not so loose as to bring about hammering and wear of the fit. Furthermore, difficulty has been experienced in operating any ball-bearing, of the size required, under thrust-load, at speeds above 8000 R. P. M., due to the forces set up within the bearing by the interaction of its parts. The balls, in attempting to rotate about an axis at an angle to the shaft-axis, develop a destructive spinning motion. Under thrust load, all of the balls are held firmly between the two races. Due to small inequalities in diameter, however, certain balls in the group tend to rotate about the bearing-axis at different speeds than the other balls, thereby setting up a continuous dragging action, transmitted through the cage or retainer, resulting in rapid cage-wear.

The above-mentioned difficulties with the thrust-bearings for vertical-shaft rayon-spinning motors have been aggravated by the pounding effects resulting from vertical resonance of the dynamic system at high speeds, and also by the dropping of the bucket on the adapter. This dropping may be accidental, when the bucket is being placed on the adapter when the mechanism is at standstill, or it may be intentional, in plants in which the motor is started while the bucket is off, during the "doffing" process, the bucket being dropped onto the adapter while the latter is operating at full speed. These vertical impacts all result in momentarily flattening the thrust-carrying ball or balls, with consequent damage to the bearing.

With the foregoing and other considerations in mind, we have developed, for our spinning-motor, in order to make excessively high speeds possible, an oil-film type of thrust-bearing, in which there is no metal-to-metal contact during normal operation, and in which there can be no distortion of a spherical contact-surface as a result of vertical impacts; and we have also adopted a design in which there is vertical flexibility of the dynamic system, so that the vertical critical speed is lowered out of the operating range.

As shown in Figs. 4, 5 and 6, we utilize a shoe-type of thrust-bearing, mounted underneath the rotor-shaft 49, in the bottom of the sump-portion 40 of the oil-reservoir. The bottom of the rotor-shaft 49 is provided with a flat runner 82, for the thrust-bearing, and the bottom surface of the runner is supported on one or more flat thrust-bearing shoes 83. In the particular design shown, there are two shoes 83 which, as shown in Fig. 6, are chamfered, as at 84, in order to obtain an entering-action of the oil.

Each of the thrust-bearing shoes 83 is mounted freely, so as to rest upon, and be supported by, the upper end of a vertical-thrust spring 85. These two springs 85 carry the entire weight of the rotating parts of the spinning-motor assembly. In this manner we reduce the vertical critical resonance-speed to such a low value that it no longer constitutes any problem, being certainly much lower than the operating speed and being undiscernible in actual operation.

In order to center the thrust-bearing shoes 83 on the tops of their respective springs 85, it would have been possible to let the tops of the springs 85 hold the shoes in place, but we have considered it to be preferable to provide a separate restraining means, or mounting means, for substantially restraining the shoes 83 from rotational displacement and from all lateral translational displacement, while leaving them perfectly free for vertical translational displacement and for angular displacements. To this end, we utilize a peculiarly shaped flat leaf-spring 86, of U-shape, fixedly mounted by screws 87 in its bight portion, and having parallel shoe-supporting portions 88 extending inwardly from the free ends of the two arms 89 of the U. The shoes 83 are riveted to these shoe-supporting portions 88, as indicated at 90. This flat-spring support thus provides a shoe-mounting which is very rigid laterally, but very flexible for vertical displacements and for tilting displacements of the shoes.

Reference to Figs. 7a and 7b will show what occurs in the complete dynamic balance which is obtained in our aggregate which is shown in Fig. 4. In Figs. 7a and 7b, the driven mass consisting of the bucket 28 and the adapter 53 is represented by means of a solid cylinder 91, and the small unbalancing weight is indicated at 92. This representation neglects the mass of the induction-motor rotor as a part of the rotor-mass of the dynamic system, which is mathematically permissible because of the small motion of the induction-motor rotor and because of the extreme rigidity of the rotor-shaft 49.

The cylinder 91, before the addition of the unbalancing mass 92, has a center of gravity 93, through which pass the principal inertia axes, namely, the vertical axis 94 and the horizontal axis 95. The vertical and horizontal moments of inertia, which are referred to in the description of our invention, are the moments of inertia with respect to these two principal axes.

The addition of the small unbalancing mass 92 changes the center of gravity from the point 93 to the point 96, resulting in a horizontal displacement by the amount indicated at 97. The centrifugal force exerted by the small unbalancing weight 92 also produces a couple tending to rotate the mass about its new center of gravity 96 so that the axis about which the total mass now rotates is, not only displaced laterally by the distance 97, but is also tilted angularly through the angle 98, so that the mass eventually rotates about the axis 99, such that the centrifugal action of the original mass, considered as being concentrated at the center of gravity 93, will be equal and opposite to the centrifugal action of the small unbalancing weight 92.

With the foregoing explanations in mind, it will be perceived that the only unbalancing forces which are transmitted to the guide-bearings 66 and 63 in Fig. 4 are the forces necessary to flex the flexible spindle-portion 51 of the shaft, so that the axis of rotation of the driven mass may be displaced laterally and angularly as indicated at 97 and 98 in Fig. 7b.

In a rayon spinning-motor aggregate, the rotating mass is balanced, as well as possible, of course, but it is inevitable that a certain amount of unbalancing will occur in the ordinary process of spinning the rayon thread. Ordinarily, it is assumed by the operators that this unbalancing will not amount to more than 2 grams. We have designed our aggregate so that it will easily withstand an unbalance of as much as 10 or 15 grams, located at the worst possible place, namely, at the top rim of the rayon bucket 28.

As previously indicated, an essential feature of our invention is the provision of shaft-flexibility, or spring-action which is introduced between the driven mass consisting of the bucket and the adapter, on the one hand, and the portion of the shaft which is restricted against lateral displacement, at the oil-hinge 69, on the other hand, so that the driven mass may have lateral and angular displacements with respect to the portion of the shaft which is restrained against lateral displacement at the oil-hinge 69.

As previously explained, this spring-action is such, in proportion to the mass itself and the difference between the horizontal and vertical inertias of the driven mass, as to bring both of the principal critical speeds, namely, the lateral critical speed and the angular critical speed, down to values which are considerably below the lowest operating speed of the motor-aggregate; and preferably these two critical speeds should have values which are somewhere close to each other, so that the corresponding resonance-vibrations may both be damped by the oil-damping means, which should preferably have its maximum effectiveness somewhere within the region of these two critical speeds, and which should by no means become so stiff as to lose its damping action, until a speed has been attained which is higher than both of the principal critical speeds of the dynamic system.

In our design which is illustrated in Fig. 4, the lateral or translational critical speed occurs at somewhere around 500 R. P. M.; and the angular critical speed at somewhere around 1500 to 2000 R. P. M.; with the bucket in place. With the bucket removed, as in the "doffing" process, if the motor-aggregate is put into operation at this time, the respective critical speeds will perhaps be of the order of 1000 and 4000 R. P. M. At somewhere around 5000 R. P. M., our damping system becomes essentially rigid. With an oil-damper consisting of a large number of nested sleeves, we thus provide a large amount of damping at speeds where the principal resonance-phenomena occur, thus making it possible for the motor-aggregate to be accelerated and decelerated through these critical resonance-speeds, without destructive vibration of the parts.

By reason of our increase in the horizontal inertia of the driven mass, without materially increasing the vertical inertia thereof, we are enabled to accomplish these results without too great a decrease, or weakening, in the stiffness of the shaft, referring, now, to the spindle-portion 51 of the shaft, where the spring-action is obtained. At the same time, by avoiding an excessively large vertical inertia of the driven mass, we provide a dynamic system which may be rapidly accelerated and decelerated through the principal critical speeds, so that the dynamic system does not have time to build up large oscillations at these critical speeds, which is an important adjunct to the damping system in making it possible to successively pass through the critical speeds of the aggregate, with the minimum possible vibration.

It will be noted, moreover, that we have placed all of our bearing-means below the point of attachment 48 of the quill to the shaft, or the point of attachment of the motor-rotor member to the shaft, so that there is no oil above the motor-rotor, and hence no particular problem of keeping oil out of the electrical-winding parts. With this construction, therefore, we can utilize a flooded lubrication system, avoiding all metal-to-metal bearing-contacts in both the guide bearings and the thrust bearing, thus contributing materially to a long life of bearings, which is of great importance in an apparatus which is designed to operate, almost continuously, at high speeds.

By providing a design which operates well above its speed of complete dynamic adjustment, we achieve a spinning-motor aggregate in which the effect of any unbalance in the driven mass or bucket is completely counteracted or absorbed by the dynamic system itself, that is, by the rotation of the driven mass about a new axis of rotation which automatically adjusts itself so that the centrifugal force of the mass exactly counterbalances the centrifugal force of the small unbalancing weight. The loads which are imposed on the bearings as a result of the small unbalancing weight can, therefore, be made as low as desired, by increasing the length or the flexibility of the shaft connecting the driven mass to the bearings, as the only unbalanced loads which are transmitted to the bearings are the small forces necessary to bend the flexible portion of the shaft so as to enable the driven mass to rotate about its proper dynamic axis of rotation. This is in sharp contrast to designs in which an important critical speed occurs above the operating speed of the mechanism, in which case the centrifugal forces developed by the small unbalancing weight must actually be counteracted, at least in part, in the guide bearings for the shaft.

In our design, therefore, the wear of our bearings is negligible, because the bearing-loads are very light, and because the bearings are flooded with lubricating oil. We have also ascertained, experimentally, that we are free of oil-whip problems, principally, we believe, because of our very adequate damping, in conjunction with our very much improved bearing-performance which we obtain with our light bearing-loads and flooded lubrication.

Summarizing the advantages of our Fig. 4 design, we may list (1) low critical speeds, (2) small eccentricity of running, at the high operating speed, (3) no oil-whip, (4) small rotational inertia for facilitating rapid acceleration, and (5) low bearing-loads for a given shaft-distortion.

There are certain relatively unimportant details in the Fig. 4 design which might be mentioned. Since the rotor-shaft 49 is made hollow, for constructional reasons, and since the rapid rotation of the shaft has an oil-lifting tendency, it is desirable to plug the internal bore of the shaft by means of a cork stopper 101, so as to prevent the possibility of the oil rising, and getting past the tapered frictional joint 50 where the spindle 51 fits in the top of the shaft. Thus, we make sure that no oil reaches the upper portion of the space occupied by the motor-windings 34.

Of perhaps more practical importance is a detail involving the use of a vertically extending standpipe 102, extending upwardly beyond the top of the stator-frame 32, surrounding a portion of the spindle 51, and being surrounded by the depending portion 56—57 of the adapter 53, and being spaced from both. This standpipe 102 serves the very useful purpose of not only safeguarding the lives of the operators in case of breakage of the spindle 51, but also limiting the damage which might be done to the bearings 63 and 66 located down inside of the motor, and which might be so severely damaged as to entail a protracted shut-down for repairs, in case of the excessive bending or breakage of the spindle 51. The standpipe 102 makes such excessive deflection of the spindle impossible, so that the only harm resulting from a bucket-explosion or other accident causing a broken spindle would be a momentary stoppage for a period long enough to insert a new spindle.

The standpipe 102 also serves to prevent the flying off of the adapter 53, in case of a spindle-failure. In the particular design shown in Fig. 4, the standpipe is provided with a cork buffer 103 at the point where the lower end of the adapter 53 might come in contact with it.

To safeguard against the event of spindle-failure, in the rayon spinning art as now practiced, the previously utilized rotating masses, consisting of the bucket 28 and the old type of adapter 54—55, are surrounded by a tubular guard 104, to prevent loss of life or injury as a result of bucket explosions, but this guard would not commonly extend down far enough to take care of the lower depending portion 56—57 which we have added to our adapter 53. Our standpipe 102 overcomes this deficiency in the old guard 104, as well as protecting the motor-aggregate from internal injury, in case of spindle-failure, as above pointed out.

Fig. 8 shows an embodiment of our invention which was designed to take care of much larger unbalances than were contemplated in the Fig. 4 design. Our Fig. 8 aggregate was designed to stand as much as 50 grams unbalance in the rotating mass, and was designed particularly for the type of centrifuge known in the rayon industry as an extractor, for removing excess liquid from the "cake" of rayon thread after it is removed from the spinning bucket.

In order to illustrate the different design-principles underlying our invention, we have illustrated the Fig. 8 aggregate as one in which the angular critical speed, instead of being made very low, as compared with the operational speed, is made very much higher than the operating speed, so that the operating speed lies between the two principal critical speeds of the aggregate. It should be understood, of course, that, at present, while we prefer a design in which both of the critical speeds are below the operating speed, there are certain considerations, such as simplicity of design, which may make it desirable to cause the two principal critical speeds to be very far apart, and to operate the aggregate at an intermediate speed between them. It should also be distinctly understood that either method of design may be used with either the rayon spinning-motor aggregate of Fig. 4 or the extractor-motor aggregate of Fig. 8.

For operation between the two critical speeds, it will be realized that the dynamic effect of the small unbalancing weight will be to cause certain loads or reactions on the guide bearings. These reactions may be reduced by increasing the length of the shaft, between the driven mass and the bearings, so as to change the moment-arms, and they may be reduced, also, by dividing the bearing-load between the two bearings, as by having the flexible portion of the shaft secured to the rigid portion of the shaft at an intermediate point between the two bearings.

Reference to Fig. 8 will show how such a design may be carried out. In this figure, the design is, in some features, similar to that which has been described in connection with Fig. 4, so that attention will be given principally to the contrasting features of the design, without unnecessary repetitions of the description of the features which are the same as in Fig. 4.

In Fig. 8, the extractor bucket 107, which may be made from any strong, non-corrosive, and preferably light-weight, material, such as aluminum, is somewhat like the spinner bucket 28 of Fig. 4, except that it has an internal upwardly extending hub 108, which is fastened directly to the top of the spindle 51a, instead of being fitted onto the adapter nose as in Fig. 4. In Fig. 8, an adapter 110 is utilized, which is of light-weight material, and which is mounted with small axial spacing below the bucket 107 for reasons hereinafter stated. The tapering top portion 52 of the spindle, which carries both the adapter 110 and the bucket 107, is substantially rigid, so that the bucket 107, the adapter 110, and the spindle-head 52 operate, in the Fig. 8 design, as a single integral mass, as do the corresponding members in our Fig. 4 design.

In order to cause the second principal critical speed, corresponding to the critical speed 11 in Fig. 2b, to be very much higher than the first critical speed, corresponding to the critical speed 10 in Fig. 2b, our Fig. 8 design utilizes a spindle 51a which is much less flexible than the spindle 51 in Fig. 4, except at the extreme lower end 111 of the spindle 51a in Fig. 8, where the spindle is quite flexible, so that the spindle may bend or flex at this point.

The Fig. 8 design is such that the expression $$\sqrt{\frac{k'}{I_H - I_V}}$$

for the critical speed of angular adjustment is very large, while the expression $$\sqrt{k/m}$$

for the critical speed of lateral adjustment is very small. These conditions require, in the first place, that the shaft shall be constructed to have a low value for the spring-constant $k$, in the expression $$\sqrt{k/m}$$

for the lateral critical speed, and a high value for the angular spring-constant $k'$, in the expression $$\sqrt{\frac{k'}{I_H - I_V}}$$

for the angular critical speed. We accomplish this by making the spindle 51a in Fig. 8 slender at its lower end 111, but increasing up to a relatively heavy section just below the spindle-head 52, as described in the preceding paragraph. With a spindle of this construction, and a driven mass $m$ of conventional value, the lateral critical speed $$\sqrt{k/m}$$

is very much lower than ordinary operating speeds.

To obtain a very high value of the angular critical speed, $$\sqrt{\frac{k'}{I_H - I_V}}$$

we supplement the effect of our special tapering spindle-construction by making the horizontal inertia $I_H$ of the bucket-aggregate as small as possible. We accomplish this by extending the bucket-hub 108 upward, rather than downward as in Fig. 4, and by making the adapter 110 of light-weight material, with minimum axial spacing from the bucket 107. The adapter 110, in Fig. 8, is, in effect, substantially only a shroud to keep foreign matter out of the open top end of the standpipe 102 of the motor.

As previously explained, if the material to be handled should permit a horizontal inertia $I_H$ less than the vertical inertia $I_V$, we should have a dynamic condition corresponding to our Figs. 1a and 1b. In such event, it would obviously be unnecessary to make the shaft have a high angular spring-constant $k'$, and hence the spindle would not have to have a tapered construction, but could, and preferably would, be of substantially uniform flexibility throughout its length.

The extractor motor aggregate shown in Fig. 8 embodies a new design principle, necessitating, as in Fig. 4, the rigid bolting of the motor-frame onto the foundation or support 38, so that there will be only two principal critical speeds in the dynamic system, and so that it will be possible to design the system so that these two critical speeds are very far apart. If there were more freedoms of motion, such as would be obtained by the yieldable mounting of the motor as a whole, as commonly done in previous designs, there would be several intermediate critical speeds, so that it would be, as a practical matter, impossible to find any speed, between any two critical speeds, which could be chosen as the operating speed of the aggregate, and which would be far removed from the critical speed on either side of it.

As previously mentioned, the operation of the aggregate at a speed between the two principal critical speeds, as in Fig. 8, entails some additional bearing loads, as reactions of the dynamic unbalance, and hence it is desirable to cause the spindle 51a to join the hollow rotor shaft 49a at a point which is below the upper guide-bearing 66 so as to distribute the load between the two guide-bearings 66 and 63. To this end, the tapered fit 50a between the spindle 51a and the hollow shaft 49a is brought down much lower, in Fig. 8, than in Fig. 4, so that the junction 50a shall be at about the midpoint in the length of the rotor-shaft 49a, instead of being near the top thereof as in Fig. 4. It will be understood, of course, that, in Fig. 8, the top portion of the hollow shaft 49a must be large enough to keep out of contact with the spindle 51a, as the latter flexes in the normal operation of the aggregate.

The damping system in Fig. 8 is the same as that shown in Fig. 4, except that additional damping is provided by means of one more nested sleeve 75a, in Fig. 8, than in Fig. 4.

The oil-circulation systems shown in Figs. 4 and 8 are similar, except that Fig. 8 shows, by way of example, a different means for forcing the oil into the space 65 between the inner bore of the bearing-tube 58 and the outer diameter of the rotor-shaft 49a. For this purpose, instead of relying upon the oil-lifting action of the journal-bearing groove 64 of Fig. 4, we utilize, in our Fig. 8 embodiment, a plurality of pumping-holes 120, in the hollow shaft 49a, so as to draw the oil up centrally, within the bore of the hollow shaft, and expel it, by centrifugal action, through the holes 120, thus forcing it to flow upwardly, and through the top bearing 66, and on through the oil-hinge 69. In order to permit the oil to enter the bore of the hollow shaft 49a, at the bottom end thereof, the thrust-bearing runner 82a is provided with an oil-inlet hole 122.

The Fig. 8 aggregate requires artificial cooling, to absorb the losses, and hence we have provided an air-shroud 130 surrounding the stator-frame 32, and we have equipped the bottom of the adapter 110 with blades 131 for drawing the air up, between the frame and the shroud, and expelling the same, by centrifugal action.

When designing an extractor for operation above both of the two principal critical speeds, instead of operating between said two principal critical speeds, as in Fig. 8, we prefer to supplement our downwardly hung adapter-counterweight, such as 57 of Fig. 4, or 131 of Fig. 8, or to dispense with it entirely, by an enlarged upward extension or counterweight 132 on the central hub 108a of the extractor-bucket 107a, as shown in Fig. 9. The upwardly projecting counterweight 132 may be in the form of a nut, of heavier material than the bucket 107a, engaging the top end of a flexible spindle 51a which may be of dimensions similar to the spindle 51 in Fig. 4. By this construction, we obtain a considerable increase in the horizontal inertia $I_H$ with but a small increase in the vertical inertia $I_V$. The hub 108a is preferably made hollow, so that the tapered upper end of the spindle 51a engages only the upper end of the hub, at a point which is somewhere near the center of gravity of the bucket-assembly 107a, 108a, 132.

In both of the designs shown in Figs. 4 and 8, it will be observed that we have utilized a fixed-frame, internally damped aggregate, that is, an aggregate in which all of the damping is between the rotor and the stator of the aggregate itself, without any damping between the aggregate and the supporting foundation therefor.

In both of the designs shown in Figs. 4 and 8, it will be observed, also, that we have placed the important critical speeds well outside of the operating range, by "important" meaning critical speeds at which large motions or loads occur in the machine. And when we say that the aggregate has two critical speeds, we mean to include the case when said two critical speeds substantially coincide or merge into one, which is obviously possible if they are both below the operating speed.

While we have described the essential features of our invention, and have illustrated the same in structural designs which we now consider desirable or adequate, it is to be distinctly understood that such illustration is only by way of example, and that our invention is susceptible of considerable modification in the precise details of embodying the same. We desire, therefore, that the appended claims shall be accorded the broadest construction consistent with their language and the prior art.

We claim as our invention:

1. A vertical-shaft electric-motor mechanism for the rapid rotation of a driven-mass assembly adapted to be secured near one end of, and solely supported by, the shaft, comprising, in combination, a motor-stator member, a motor-rotor member having an operating speed of at least 6000 R. P. M., said shaft including a shaft-portion substantially rigidly attached to said rotor member, means for substantially rigidly supporting said stator member, said shaft portion having flexibility at least somewhere between its points of attachment to said driven-mass assembly and said motor-rotor member, guide-bearing means for the shaft, means for so supporting the guide-bearing means that the shaft is substantially restricted from lateral movement, but has some freedom of angular movement, at a point near said motor-rotor member, and damping means for permitting a portion of said guide-bearing means to have some lateral movement, but damping such movement, at a point axially removed from both said driven-mass assembly and said point of restriction; the relations of the parts being such that the mechanism will have two, and substantially only two, principal critical speeds of shaft-displacement at the driven-mass assembly, one of said critical speeds being a low angular resonance-speed, characterized by the horizontal moment of inertia of said driven-mass assembly being sufficiently greater than the vertical moment of inertia of said driven-mass assembly, and the angular spring-constant of said flexible portion of the shaft being so low, within the limits of a safe mechanical strength, that said low angular resonance-speed is less than said operating speed; the other of said critical speeds being a low resonance speed of lateral displacement of the shaft, characterized by a relationship of the parts such that the mass of said driven-mass assembly is sufficiently high, and the spring-constant of said flexible portion of the shaft being so low, within the limits of a safe mechanical strength, that said low resonance-speed of lateral displacement is less than said operating speed; the damping means being effective at said critical speeds.

2. A high-speed mechanism, comprising a vertical shaft, a driven-mass assembly attached to, and solely supported by, said shaft, means for rotating the shaft at a high speed, the rotating torque being applied to the shaft at a point which is spaced from said driven mass assembly, the shaft including a mass-supporting spindle-portion having flexibility at least somewhere between the point of attachment of the driven-mass assembly and the point where the rotating torque is applied thereto, guide-bearing means for so guiding said shaft that it is substantially restricted from lateral movement, but has some freedom of angular movement, at a point near the point of application of said rotating torque, and damping means for permitting a portion of said guide-bearing means to have some lateral movement, but damping such movement, at a point removed from both said driven mass assembly and said point of restriction from lateral movement.

3. The invention as defined in claim 2, characterized by said mechanism having an operating speed of at least 6000 R. P. M., the horizontal moment of inertia of said driven-mass assembly being sufficiently larger than the vertical moment of inertia of said driven-mass assembly, and the angular spring-constant of said spindle-portion being so low, within the limits of a safe mechanical strength, that the principal critical speed of angular shaft-displacement at the driven-mass assembly is below the operating speed, and the mass of said driven-mass assembly being sufficiently high, and the spring-constant of said spindle-portion being so low, within the limits of a safe mechanical strength, that the principal critical speed of lateral shaft-displacement at the driven-mass assembly is also below the operating speed.

4. The invention as defined in claim 2, characterized by said mechanism having an operating speed of at least 6000 R. P. M., the horizontal moment of inertia of said driven-mass assembly being sufficiently larger than the vertical moment of inertia of said driven-mass assembly, and the angular spring-constant of said spindle-portion being so low, within the limits of a safe mechanical strength, that substantially complete dynamic adjustment will occur, for dynamic unbalance in the driven-mass assembly, at the operating speed.

5. A high-speed mechanism, comprising a vertical shaft, a driven mass attached to, and solely supported by, said shaft, means for rotating the shaft at a high speed, the rotating torque being applied to the shaft at a point which is below, and spaced from, said mass, and which is above, and spaced from, the bottom end of the shaft, the shaft having flexibility at least somewhere between its point of attachment to said mass and a point near the point of application of said rotating torque, guide-bearing means for so guiding said shaft that it is substantially restricted from lateral movement, but has some freedom of angular movement, at a point which is above the lower end of said guide-bearing means and which is also near said point of application of said rotating torque, and means for so supporting the lower portion of said guide-bearing means as to apply thereto some damping against lateral movement.

6. In combination, a high-speed, vertical-shaft, electric motor, comprising a stator member, a rotor member including a vertical shaft, a vertical spindle extension secured to the shaft so as to extend beyond one end of the shaft, a driven mass attached to, and solely supported by, the spindle at a point removed from the point of attachment of the spindle to the shaft, the spindle having flexibility at least somewhere between its points of attachment to the shaft and the driven mass, respectively, guide-bearing means for the shaft, means for so supporting the guide-bearing means that the shaft is substantially restricted from lateral movement, but has some freedom of angular movement, at some predetermined point in the shaft which is spaced from said mass and close to said motor-rotor member, damping means for permitting a portion of said guide-bearing means to have some lateral movement, but damping such movement, at a point removed from both said mass and said predetermined point in the shaft, and means for substantially rigidly supporting said stator member.

7. A high-speed mechanism, comprising a shaft, means for rotating the shaft at an operating speed of at least 6000 R. P. M., a driven-mass assembly attached to, and solely supported by, the shaft, guide-bearing means for the shaft, said guide-bearing means having a single, rigid, tubular, non-rotating housing, means for so supporting the guide-bearing means that the shaft is substantially restricted from lateral movement, but has some freedom of angular movement, at some predetermined point axially removed from said driven-mass assembly, and damping means for permitting a portion of said guide-bearing means to have some lateral movement, but damping such movement, at a point axially removed from both said driven-mass assembly and said predetermined point in the shaft; the shaft having flexibility at least somewhere between said driven-mass assembly and the point of application of said rotating means; the relations of the parts being such that the mechanism will have at least one principal critical speed of shaft-displacement at said driven-mass assembly, said critical speed being a low resonance-speed of lateral displacement of the shaft, characterized by a relationship of parts such that the driven-mass assembly of said mass is sufficiently high, and the spring-constant of said flexible portion of the shaft being so low, within the limits of a safe mechanical strength, that said low resonace-speed of lateral displacement is less than said operating speed; the damping means being effective at said critical speed.

8. A high-speed mechanism, comprising a shaft, means for rotating the shaft at an operating speed of at least 6000 R. P. M., a driven mass attached to, and solely supported by, the shaft, guide-bearing means for the shaft, said guide-bearing means having a single, rigid, tubular, non-rotating housing, means for so supporting the guide-bearing means that the shaft is substantially restricted from lateral movement, but has some freedom of angular movement, at some predetermined point axially removed from said mass, and damping means for permitting a portion of said guide-bearing means to have some lateral movement, but damping such movement, at a point axially removed from both said mass and said predetermined point in the shaft; the shaft having flexibility at least somewhere between said driven mass and the point of application of said rotating means; the relations of the parts being such that the mechanism will have at least one principal critical speed of shaft-displacement at the mass, said critical speed being a low angular resonance-speed, characterized by the moment of inertia of said mass with respect to an axis passing through the center of gravity of said mass at right angles to the shaft being sufficiently larger than the moment of inertia of said mass with respect to the shaft-axis, and the angular spring-constant of said flexible portion of the shaft being so low, within the limits of a safe mechanical strength, that said low angular resonance-speed is less than said operating speed; the damping means being effective at said critical speed.

9. A vertical-shaft mechanism for the rapid rotation of a removable driven mass adapted to be secured near one end of, and solely supported by, the shaft, comprising, in combination, an adapter attached to the shaft, near said end of the shaft, for rigid connection with respect to said removable driven mass, said adapter having an axially displaced mass surrounding, and closely spaced from, the center-line of the shaft at a point axially spaced from the point of attachment of the adapter to the shaft, means for rotating the shaft at a high speed, the rotating torque being applied to the shaft at a point which is axially spaced from the adapter, the shaft including a mass-supporting spindle-portion having flexibility at least somewhere between the point of attachment of the adapter and the point where the rotating torque is applied thereto, guide-bearing means for so guiding said shaft that it is substantially restricted from lateral movement, but has some freedom of angular movement, at a point near the point of application of said rotating torque, and damping means for permitting a portion of said guide-bearing means to have some lateral movement, but damping such movement, at a point axially removed from both said adapter and said point of restriction from lateral movement.

10. The invention as defined in claim 9, characterized by said rotating means having an operating speed of at least 6000 R. P. M., said adapter having a larger horizontal moment of inertia than vertical moment of inertia, whereby the mechanism, with the driven mass removed, has a principal critical speed of angular shaft-displacement at the adapter, as well as a principal critical speed of lateral shaft-displacement at the adapter, the horizontal moment of inertia of said adapter being sufficiently larger than the vertical moment of inertia of said adapter, and the angular spring-constant of said spindle-portion being so low, within the limits of a safe mechanical strength, that said angular critical speed is below the operating speed, and the mass of said adapter being sufficiently high, and the spring-constant of said spindle-portion being so low, within the limits of a safe mechanical strength, that said lateral critical speed is also below the operating speed.

11. In combination, a high-speed, vertical-shaft, electric motor, comprising a stator member, a rotor member including a vertical shaft, a vertical spindle detachably secured to the shaft so as to extend above the upper end of the shaft, a driven mass attached to, and solely supported by, the spindle at a point removed from the point of attachment of the spindle to the shaft, the spindle having flexibility at least somewhere between its points of attachment to the shaft and the driven mass, respectively, guide-bearing means for the shaft, means for so supporting the guide-bearing means that the shaft is substantially restricted from lateral movement, but has some freedom of angular movement, at some predetermined point in the shaft which is below said mass and close to said motor-rotor member, damping means for permitting a portion of said guide-bearing means to have some lateral movement, but damping such movement, at a point which is below, and spaced from, said predetermined point in the shaft, means for substantially rigidly supporting said stator member, and a stationary pipe upstanding from said stator member, surrounding, and spaced from, said spindle throughout at least a portion of the length of the spindle.

12. A vertical-shaft mechanism for the rapid rotation of a driven-mass assembly adapted to be secured near one end of, and solely supported by, the shaft, characterized by a frame member, means for rotating the shaft at an operating speed of at least 6000 R. P. M., the rotating torque being applied to the shaft at a point which is spaced from said driven-mass assembly, guide-bearing means for the shaft, means for so supporting the guide-bearing means from said frame member that the shaft is substantially restricted from lateral movement, but has some freedom of angular movement, with respect to said frame member, at some predetermined point in the shaft which is near the point of application of said torque, and damping means for permitting a portion of said guide-bearing means to have some lateral movement with respect to said frame member, but damping such movement, at a point axially removed from both said driven-mass assembly and said predetermined point in the shaft; the shaft having flexibility at least somewhere axially removed from the point of attachment of said driven-mass assembly to the shaft; the relations of the parts being such that the mechanism will have at least one principal critical speed of shaft-displacement, said critical speed being a low resonance-speed of lateral displacement of the shaft, the relationship of parts being such that the mass of said driven-mass assembly is sufficiently high, and the spring-constant of said flexible portion of the shaft being so low, within the limits of a safe mechanical strength, that said low resonance-speed of lateral displacement is less than said operating speed; the damping means being effective at said critical speed.

13. A vertical-shaft mechanism for the rapid rotation of a driven-mass assembly adapted to be secured near one end of, and solely supported by, the shaft, characterized by a frame member, means for rotating the shaft at an operating speed of at least 6000 R. P. M., the rotating torque being applied to the shaft at a point which is spaced from said driven-mass assembly, guide-bearing means for the shaft, means for so supporting the guide-bearing means from said frame member that the shaft is substantially restricted from lateral movement, but has some freedom of angular movement, with respect to said frame member, at some predetermined point in the shaft which is near the point of application of said torque, and damping means for permitting a portion of said guide-bearing means to have some lateral movement with respect to said frame member, but damping such movement, at a point axially removed from both said driven-mass assembly and said predetermined point in the shaft; the shaft having flexibility at least somewhere axially removed from the point of attachment of said driven-mass assembly to the shaft; the relations of the parts being such that the mechanism will have at least one principal critical speed of shaft-displacement, said critical speed being a low angular resonance-speed, characterized by the horizontal moment of inertia of said driven-mass assembly being sufficiently greater than the vertical moment of inertia of said driven-mass assembly, and the angular spring-constant of said flexible portion of the shaft being so low, within the limits of a safe mechanical strength, that said low angular resonance-speed is less than said operating speed; the damping means being effective at said critical speed.

14. A vertical-shaft electric-motor mechanism for the rapid rotation of a driven-mass assembly adapted to be secured near one end of, and solely supported by, the shaft, comprising, in combination with the vertical shaft, a motor-stator member, a motor-rotor member attached to said shaft in cooperative relation to said motor-stator member and having an operating speed of at least 6000 R. P. M., guide-bearing means for the shaft, means for so supporting the guide-bearing means that the shaft is substantially restricted from lateral movement with respect to said motor-stator member, but has some freedom of angular movement, at some predetermined point near said motor-rotor member, and damping means for permitting a portion of said guide-bearing means to have some lateral movement with respect to said motor-stator member, but damping such movement, at a point axially removed from both said driven-mass assembly and said predetermined point in the shaft; the shaft having flexibility at least somewhere axially removed from the point of attachment of said driven-mass assembly to the shaft; the relations of the parts being such that the mechanism will have a principal critical speed of shaft-displacement, said critical speed being a low resonance-speed of lateral displacement of the shaft, the relationship of parts being such that the mass of said driven-mass assembly is sufficiently high, and the spring-constant of said flexible portion of the shaft being so low, within the limits of a safe mechanical strength, that said low resonance-speed of lateral displacement is less than said operating speed; the damping means being effective at said critical speed.

15. A vertical-shaft electric-motor mechanism for the rapid rotation of a driven-mass assembly adapted to be secured near one end of, and solely supported by, the shaft, comprising, in combination with the vertical shaft, a motor-stator member, a motor-rotor member attached to said shaft in cooperative relation to said motor-stator member and having an operating speed of at least 6000 R. P. M., guide-bearing means for the shaft, means for so supporting the guide-bearing means that the shaft is substantially restricted from lateral movement with respect to said motor-stator member, but has some freedom of angular movement, at some predetermined point near said motor-rotor member, and damping means for permitting a portion of said guide-bearing means to have some lateral movement with respect to said motor-stator member, but damping such movement, at a point axially removed from both said driven-mass assembly and said predetermined point in the shaft; the shaft having flexibility at least somewhere axially removed from the point of attachment of said driven-mass assembly to the shaft; the relations of the parts being such that the mechanism will have a principal critical speed of shaft-displacement, said critical speed being a low angular resonance-speed, characterized by the horizontal moment of inertia of said driven-mass assembly being sufficiently greater than the vertical moment of inertia of said driven-mass assembly, and the angular spring-constant of said flexible portion of the shaft being so low, within the limits of a safe mechanical strength, that said low angular resonance-speed is less than said operating speed; the damping means being effective at said critical speed.

16. A vertical-shaft electric-motor mechanism for the rapid rotation of a driven-mass assembly adapted to be secured near one end of, and solely supported by, the shaft, comprising, in combination, a motor-stator member, a motor-rotor member having an operating speed of at least 6000 R. P. M., said shaft including a shaft-portion substantially rigidly attached to said rotor member, means for substantially rigidly supporting said stator member, said shaft having flexibility at least somewhere between its points of attachment to said driven-mass assembly and said motor-rotor member, guide-bearing means for the shaft, means for so supporting the guide-bearing means that the shaft is substantially restricted from lateral movement, but has some freedom of angular movement, at a point near said motor-rotor member, and damping means for permitting a portion of said guide-bearing means to have some lateral movement, but damping such movement, at a point axially removed from both said driven-mass assembly and said point of restriction; the relations of the parts being such that the mechanism will have at least one principal critical speed of shaft-displacement at said driven-mass assembly, said critical speed being a low resonance-speed of lateral displacement of the shaft, the relationship of parts being such that the mass of said driven-mass assembly is sufficiently high, and the spring-constant of said flexible portion of the shaft being so low, within the limits of a safe mechanical strength, that said low resonance-speed of lateral displacement is less than said operating speed; the damping means being effective at said critical speed.

17. A vertical-shaft electric-motor mechanism for the rapid rotation of a driven-mass assembly adapted to be secured near one end of, and solely supported by, the shaft, comprising, in combination, a motor-stator member, a motor-rotor member having an operating speed of at least 6000 R. P. M., said shaft including a shaft-portion substantially rigidly attached to said rotor member, means for substantially rigidly supporting said stator member, said shaft portion having flexibility at least somewhere between its points of attachment to said driven-mass assembly and said motor-rotor member, guide-bearing means for the shaft, means for so supporting the guide-bearing means that the shaft is substantially restricted from lateral movement, but has some freedom of angular movement, at a point near said motor-rotor member, and damping means for permitting a portion of said guide-bearing means to have some lateral movement, but damping such movement, at a point axially removed from both said driven-mass assembly and said point of restriction; the relations of the parts being such that the mechanism will have at least one principal critical speed of shaft-displacement at the driven-mass assembly, said critical speed being a low angular resonance-speed, characterized by the horizontal moment of inertia of said driven-mass assembly being sufficiently greater than the vertical moment of inertia of said driven-mass assembly, and the angular spring-constant of said flexible portion of the shaft being so low, within the limits of a safe mechanical strength, that said low angular resonance-speed is less than said operating speed; the damping means being effective at said critical speed.

18. A high-speed mechanism, comprising a vertical shaft, means for rotating the shaft at a high speed, a driven mass attached to, and solely supported by, the shaft, a single, rigid, non-rotatable guide-bearing means for the shaft, means for so supporting the guide-bearing means that the shaft is substantially restricted from lateral movement, but has some freedom of angular movement, at some predetermined point above the lower end of the guide-bearing means, a plurality of closely spaced, nested, concentric tubular members surrounding the lower portion of the guide-bearing means, said lower portion of the guide-bearing means being nested in the innermost tubular member, means for substantially rigidly supporting the outermost tubular member, and a liquid-filling in the spaces between said nested elements.

19. A vertical-shaft drive-mechanism for the rapid rotation of a driven mass adapted to be secured near the top of, and solely supported by, the shaft, comprising, in combination with the vertical shaft; a frame member; a non-rotatable guide-bearing means for the shaft; means for providing an oil-hinge between one portion of the guide-bearing means and said frame member, said oil-hinge being characterized by a frame-supported sleeve closely surrounding said portion of the guide-bearing means, and means for providing an oil-flow through the close space between said sleeve and said guide-bearing means; and means carried by said frame member for permitting another portion of said guide-bearing means to have some lateral movement with respect to said frame member, but damping such movement.

20. A high-speed mechanism, comprising a vertical shaft, means for rotating the shaft at a high speed, a driven mass attached to, and solely supported by, the upper portion of the shaft, a single, rigid, non-rotatable guide-bearing means for the shaft, means for providing an oil-hinge for a portion of the guide-bearing means above the lower end thereof, said oil-hinge being characterized by a sleeve closely surrounding the upper portion of said guide-bearing means, means for maintaining an oil-filling in the close space between the guide-bearing means and the sleeve, and means for so supporting the sleeve as to substantially restrain it against lateral movement, and a substantially rigidly supported liquid-damper means surrounding the lower portion of the guide-bearing means for permitting it to have some lateral movement, but damping such movement.

21. A high-speed mechanism, comprising a vertical shaft, means for rotating the shaft at a high speed, a driven mass attached to, and solely supported by, the shaft, a single, rigid, non-rotatable, journal-type guide-bearing means for the shaft, means for providing an oil-hinge for a portion of the guide-bearing means above the lower end thereof; said oil-hinge being characterized by a sleeve closely surrounding the upper portion of said guide-bearing means, and means for so supporting the sleeve as to substantially restrain it against lateral movement; a plurality of closely spaced, nested, concentric tubular members surrounding the lower portion of the guide-bearing means, said lower portion of the guide-bearing means being nested in the innermost tubular member, means for substantially rigidly supporting the outermost tubular member, oil-reservoir means, of which said outermost tubular member is a part, for normally maintaining an oil-level which is above said nested tubular members and below the top of said journal guide-bearing means, and means disposed within a constantly submerged portion of said oil-reservoir for delivering oil so as to overflow through the top portion of said journal and over the top thereof, returning to the oil-reservoir through the close space of the oil-hinge, between the guide-bearing means and the sleeve of the oil-hinge.

22. A high-speed mechanism, comprising a vertical shaft, means for rotating the shaft at a high speed, a driven mass attached to, and solely supported by, the upper portion of the shaft, a single, rigid, non-rotatable, journal-type guide-bearing means for the shaft, means for providing an oil-hinge for a predetermined portion of the guide-bearing means above the lower end thereof; said oil-hinge being characterized by a sleeve closely surrounding said predetermined portion of said guide-bearing means, and means for so supporting the sleeve as to substantially restrain it against lateral movement; an annular oil-drip pan surrounding the lower edge of said sleeve, a plurality of closely spaced, nested, concentric tubular members surrounding the lower portion of the guide-bearing means, said lower portion of the guide-bearing means being nested in the innermost tubular member, means for substantially rigidly supporting the outermost tubular member, oil-reservoir means, of which said outermost tubular member is a part, for normally maintaining an oil-level which is above said nested tubular members and below the top of said journal guide-bearing means, and means disposed within a constantly submerged portion of said oil-reservoir for delivering oil so as to overflow through the top portion of said journal and over the top thereof, returning through the close space of the oil-hinge, between the guide-bearing means and the sleeve of the oil-hinge, to said annular oil-drip pan, and thence to the oil-reservoir.

23. In combination, a high-speed, vertical-shaft, electric motor, comprising a stator member, a rotor member, and a shaft having a portion substantially rigidly attached to said rotor member, said shaft having upper and lower portions extending respectively above and below said rotor member, means for substantially rigidly supporting said stator member, a driven mass attached to, and solely supported by, the upper shaft-portion, a single, rigid, non-rotatable guide-bearing means for the shaft, means for so supporting the guide-bearing means that the shaft is substantially restricted from lateral movement, but has some freedom of angular movement, at some predetermined point above the lower end of the guide-bearing means, and a substantially rigidly supported liquid-damper means surrounding the lower portion of the guide-bearing means for permitting it to have some lateral movement, but damping such movement.

24. A vertical-shaft electric-motor mechanism for the rapid rotation of a removable driven-mass assembly adapted to be secured near the top of, and solely supported by, the shaft, comprising, in combination with the vertical shaft, a motor-stator member, means for substantially rigidly supporting said motor-stator member, a motor-rotor member attached to said shaft in cooperative relation to said motor-stator member and having an operating speed of at least 6000 R. P. M., said shaft having flexibility at least somewhere between the points of attachment of the motor-rotor and the driven-mass assembly, respectively, a single, rigid, non-rotatable guide-bearing means for the shaft, located wholly below the point of attachment of said motor-rotor member to the shaft, means for so supporting the guide-bearing means that the shaft is substantially restricted from lateral movement, but has some freedom of angular movement, at some predetermined point above the bottom portion of the guide-bearing means, and a substantially rigidly supported liquid-damper means surrounding the lower portion of the guide-bearing means for permitting it to have some lateral movement, but damping such movement; the relations of the parts being such that the mechanism will have at least one principal critical speed of shaft-displacement at said driven-mass assembly, said critical speed being a low resonance-speed of lateral displacement of the shaft, characterized by a relationship of parts such that the driven-mass assembly of said mass is sufficiently high, and the spring-constant of said flexible portion of the shaft being so low, within the limits of a safe mechanical strength, that said low resonance-speed of lateral displacement is less than said operating speed; the damping means being effective at said critical speed.

25. A vertical-shaft electric-motor mechanism for the rapid rotation of a removable driven mass adapted to be secured near the top of, and solely supported by, the shaft, comprising, in combination with the vertical shaft, a motor-stator member, means for substantially rigidly supporting said motor-stator member, a motor-rotor member attached to said shaft in cooperative relation to said motor-stator member and having an operating speed of at least 6000 R. P. M., said shaft having flexibility at least somewhere between the points of attachment of the motor-rotor and the driven mass, respectively, a single, rigid, non-rotatable guide-bearing means for the shaft, located wholly below the point of attachment of said motor-rotor member to the shaft, means for so supporting the guide-bearing means that the shaft is substantially restricted from lateral movement, but has some freedom of angular movement, at some predetermined point above the bottom portion of the guide-bearing means, and a substantially rigidly supported liquid-damper means surrounding the lower portion of the guide-bearing means for permitting it to have some lateral movement, but damping such movement; the relations of the parts being such that the mechanism will have at least one principal critical speed of shaft-displacement at the mass, said critical speed being a low angular resonance-speed, characterized by the horizontal moment of inertia of said mass being sufficiently larger than the vertical moment of inertia of said mass, and the angular spring-constant of said flexible portion of the shaft being so low, within the limits of a safe mechanical strength, that said low angular resonance-speed is less than said operating speed; the damping means being effective at said critical speed.

26. A vertical-shaft electric-motor mechanism for the rapid rotation of a removable driven mass adapted to be secured near the top of, and solely supported by, the shaft, comprising, in combination with the vertical shaft, a motor-stator member, means for substantially rigidly supporting said motor-stator member, a motor-rotor member attached to said shaft in cooperative relation to said motor-stator member, guide-bearing means for the shaft, located wholly below the point of attachment of said motor-rotor member to the shaft, means for so supporting the guide-bearing means that the shaft is substantially restricted from lateral movement, but has some freedom of angular movement, at some predetermined point near said motor-rotor member, and a substantially rigidly supported liquid-damper means surrounding the lower portion of the guide-bearing means for permitting it to have some lateral movement, but damping such movement.

27. A vertical-shaft electric-motor mechanism for the rapid rotation of a removable driven mass adapted to be secured near the top of, and solely supported by, the shaft, comprising, in combination with the vertical shaft, a quill having its upper end attached to the shaft and having an enlarged portion, spaced from the shaft, below said point of attachment, a motor-rotor member attached to the enlarged portion of said quill, a motor-stator member, means for supporting said motor-stator member in cooperative relation to said motor-rotor member, a single, rigid, non-rotatable, guide-bearing means for the shaft, located wholly below the point of attachment of the quill to the shaft, means for so supporting the guide-bearing means that the shaft is substantially restricted from lateral movement with respect to said motor-stator member, but has some freedom of angular movement, at some predetermined point near the motor-rotor member, and a liquid-damper means supported by said motor-stator member and surrounding the lower portion of the guide-bearing means for permitting it to have some lateral movement with respect to said motor-stator member, but damping such movement.

28. A vertical-shaft electric-motor mechanism for the rapid rotation of a removable driven mass adapted to be secured near the top of, and solely supported by, the shaft, comprising, in combination with the vertical shaft, a quill having its upper end attached to the shaft and having an enlarged portion, spaced from the shaft, below said point of attachment, a motor-rotor member attached to the enlarged portion of said quill, a motor-stator member, means for supporting said motor-stator member in cooperative relation to said motor-rotor member, a single, rigid, non-rotatable guide-bearing means for the shaft, located wholly below the point of attachment of the quill to the shaft, means for providing an oil-hinge for a portion of the guide-bearing means near said motor-rotor member; said oil-hinge being characterized by a sleeve disposed within, and spaced from, the enlarged portion of said quill, and closely surrounding the upper portion of said guide-bearing means, means for maintaining an oil-filling in the close space between the guide-bearing means and the sleeve, and means for so supporting the sleeve as to substantially restrain it against lateral movement with respect to the motor-stator member, and a liquid-damper means supported by said motor-stator member and surrounding the lower portion of the guide-bearing means for permitting it to have some lateral movement with respect to said motor-stator member, but damping such movement.

29. A high-speed mechanism, comprising a vertical shaft, means for rotating the shaft at a high speed, a driven mass attached to, and solely supported by, the shaft, guide-bearing means for the shaft, means for so supporting the guide-bearing means that the shaft has some freedom of lateral adjustment, thrust-bearing means for supporting the weight of the rotating parts, and a yieldable support for said thrust-bearing means, characterized by said thrust-bearing means comprising a portion having a horizontal runner-surface at the bottom end of the shaft, a thrust-plate having a flat upper surface bearing on said runner-surface, and means for restraining said thrust-plate against rotation, while leaving it substantially free to tilt with the angular tilting of the shaft.

30. A high-speed mechanism, comprising a vertical shaft, means for rotating the shaft at a high speed, a driven mass attached to, and solely supported by, the shaft, guide-bearing means for the shaft, means for so supporting the guide-bearing means that the shaft is substantially restricted from lateral movement, but has some freedom of angular movement, at some predetermined point in the shaft, and thrust-bearing means comprising a portion having a horizontal runner-surface at the bottom end of the shaft, a thrust-plate having a flat upper surface bearing on said runner-surface, and means for restraining said thrust-plate against rotation, while leaving it substantially free to tilt with the angular tilting of the shaft.

JOHN G. BAKER.
FRANK C. RUSHING.
STANLEY J. MIKINA.
HARRY D. ELSE.